(12) United States Patent
Tsai et al.

(10) Patent No.: US 11,365,790 B2
(45) Date of Patent: Jun. 21, 2022

(54) LINEAR ACTUATOR AND METHOD FOR IDENTIFYING THE SAME

(71) Applicant: HIWIN TECHNOLOGIES CORP., Taichung (TW)

(72) Inventors: Ming-Ru Tsai, Taichung (TW); Szu-Wei Yu, Taichung (TW); Chi-Lun Cheng, Taichung (TW)

(73) Assignee: HIWIN TECHNOLOGIES CORP., Taichung (TW)

(*) Notice: Subject to any disclaimer, the term of this patent is extended or adjusted under 35 U.S.C. 154(b) by 588 days.

(21) Appl. No.: 16/512,408

(22) Filed: Jul. 16, 2019

(65) Prior Publication Data

US 2021/0018078 A1 Jan. 21, 2021

(51) Int. Cl.
| | |
|---|---|
| *G06F 19/00* | (2018.01) |
| *F16H 25/20* | (2006.01) |
| *F16H 25/22* | (2006.01) |
| *G01C 9/00* | (2006.01) |
| *G07C 3/00* | (2006.01) |
| *G05B 19/404* | (2006.01) |

(Continued)

(52) U.S. Cl.
CPC ..... *F16H 25/2015* (2013.01); *F16H 25/2204* (2013.01); *G01C 9/00* (2013.01); *G01D 1/18* (2013.01); *G01P 13/02* (2013.01); *G05B 19/048* (2013.01); *G05B 19/401* (2013.01); *G05B 19/404* (2013.01); *G06K 19/077* (2013.01); *G07C 3/00* (2013.01); *G07C 3/02* (2013.01); *G07C 7/00* (2013.01)

(58) Field of Classification Search
CPC ... F16H 25/2015; F16H 25/2204; G01C 9/00; G01D 1/18; G01P 13/02; G05B 19/048; G05B 19/401; G05B 19/404; G06K 19/077; G07C 3/00; G07C 3/02; G07C 7/00

USPC ......................................................... 700/175
See application file for complete search history.

(56) References Cited

U.S. PATENT DOCUMENTS

| | | | | |
|---|---|---|---|---|
| 2002/0151988 A1* | 10/2002 | Shiba | ................... | G05B 19/404 700/13 |
| 2008/0257080 A1* | 10/2008 | Singh | ...................... | F16H 25/20 74/89.23 |

(Continued)

FOREIGN PATENT DOCUMENTS

| | | |
|---|---|---|
| CN | 101949824 A | 1/2011 |
| DE | 10 2016 100 835 A1 | 7/2017 |

(Continued)

*Primary Examiner* — Zhen Y Wu

(74) *Attorney, Agent, or Firm* — Bruce Stone LLP; Joseph A. Bruce

(57) ABSTRACT

A linear actuator and an identification method thereof are characterized in that a memory unit of the embedding device stores the parameter data of the linear actuator, such as the parameters and the axial position of the elongated shaft, and the microprocessor determines whether the sensing device is activated, and through the process of parameter analysis, data transmission, and algorithm calculation, the calculation control device performs an instantaneous calculation to determine the state of the linear actuator, thereby improving the disadvantage of a single function of the conventional technology, avoiding the problem that the unidentified linear actuator causes the abnormality of the sensing device, and effectively finding the problem of abnormal function of the linear actuator.

10 Claims, 16 Drawing Sheets

(51) Int. Cl.
*G07C 7/00* (2006.01)
*G06K 19/077* (2006.01)
*G01D 1/18* (2006.01)
*G05B 19/048* (2006.01)
*G05B 19/401* (2006.01)
*G07C 3/02* (2006.01)
*G01P 13/02* (2006.01)

(56) References Cited

U.S. PATENT DOCUMENTS

| | | | | |
|---|---|---|---|---|
| 2009/0009158 | A1* | 1/2009 | Singh | F16C 41/00 |
| | | | | 324/207.15 |
| 2009/0193920 | A1* | 8/2009 | Shige | F16H 25/2015 |
| | | | | 74/424.82 |
| 2015/0354690 | A1* | 12/2015 | Cheng | G01N 29/46 |
| | | | | 73/587 |
| 2019/0003924 | A1* | 1/2019 | Hongo | G01M 13/028 |
| 2019/0293157 | A1* | 9/2019 | Gou | F16H 25/2015 |
| 2019/0346341 | A1* | 11/2019 | Honjo | G01M 15/12 |
| 2020/0180501 | A1* | 6/2020 | Lee | H02K 11/215 |
| 2021/0095746 | A1* | 4/2021 | Ikeda | H02K 7/116 |
| 2021/0277984 | A1* | 9/2021 | Mochizuki | F16H 25/20 |

FOREIGN PATENT DOCUMENTS

| | | |
|---|---|---|
| TW | M441751 U | 11/2012 |
| TW | I600492 B | 10/2017 |

* cited by examiner

LINEAR ACTUATOR AND METHOD FOR IDENTIFYING THE SAME

BACKGROUND

Field of the Invention

The present invention relates to a linear actuator and a method for identifying the same.

Related Prior Art

Please refer to FIG. 1, which is one of the drawings of the Taiwan Patent No. (I600492) showing a method for compensating the lead error of a ball screw, the lead error data is stored in a 2D barcode 10 which is marked on the surface of a nut 11, then a scanning device 12 reads the lead error data stored in the 2D barcode 10 and transmits it to a compensation calculation unit, and then the compensation calculation unit reads the lead error data and produces a compensation data after calculation, and finally the compensation data is transmitted to and read by a control unit 13 to compensate the screw lead error. Accordingly, the lead error data of the ball screw 14 is first measured at the measuring end, and then stored in the 2D barcode 10, thereby providing the same standard environment in which the lead error of each ball screw 14 can be measured, so that the lead error measurement results can maintain consistency, and as a result, the terminal users do not have to purchase the instrument for measuring the lead error of the ball screw 14 to save the time and cost of compensating the lead error.

However, the above patent cannot support immediate online reading, and if there is a deviation or an abnormality, it will be impossible to know, and thus there is a variable that cannot be controlled. In addition, reading the lead error stored in the 2D barcode 10 with the scanning device 12 can only provide the single function of lead error measurement, and there is no other auxiliary function. There is a slight lack of function in the use function, and there is still room for improvement. To measure a variety of values, for example, to determine the types of the shafts, outer diameter and other issues, other equipments must be used, which not only causes a lot of inconvenience, but also causes the cost to rise.

In addition, when using a specific computing module to monitor specific components, it is often necessary to manually input parameters into the specific computing module after installing the ball screw. However, if the input is incorrect, it may cause an abnormality in the specific calculation module and cause downtime.

Furthermore, when the linear actuator is sensing, both ends of the connecting wire connecting the sensing device and the linear actuator should be marked to distinguish on what type of linear actuator the sensing device is mounted. However, when actually applied to a product, it may be necessary to install a plurality of linear actuators on the machine. Therefore, the connection wiring connecting the sensing device and the linear actuators is complicated, which greatly increases the installation time and the probability of error involved with the method.

SUMMARY

One objective of the present invention is to provide a linear actuator and a method for identifying the same, wherein the calculation control device can perform an instantaneous calculation to determine the state of the linear actuator, thereby improving the disadvantage of a single function of the conventional technology, avoiding the problem that the unidentified linear actuator causes the abnormality of the sensing device, effectively finding the problem of abnormal function of the linear actuator.

Another objective of the present invention is to provide a linear actuator and a method for identifying the same, which provides convenience in use and eliminates the need to manually input parameters to avoid the parameter input error.

To achieve the above objectives, linear actuator comprising:
an elongated shaft having an outer rolling groove;
a movable module movably disposed on the elongated shaft and having an inner rolling groove aligned to the outer rolling groove of the elongated shaft, wherein the inner rolling groove and the outer rolling groove define a load path;
a rolling unit rollably disposed in the load path;
an embedding device disposed in the movable module, and having a memory unit for storing parameter data of the linear actuator and a first transmission unit connected to the memory unit;
a sensing device signally connected to the embedding device and having a sensing module and a microprocessor signally connected to the sensing module, the sensing module having a second transmission unit signally connected to the first transmission unit, the microprocessor having a third transmission unit signally connected to the second transmission unit and a first calculation unit connected to the third transmission unit, wherein the first calculation unit determines whether the sensing device is activated according to the parameter data stored in the memory unit; and
a calculation control device signally connected to the sensing device, and having a fourth transmission unit connected to the third transmission unit and a second calculation unit connected to the fourth transmission unit, when the sensing device is activated, the second calculation unit is used to calculate a state of the linear actuator.

Preferably, the linear actuator is a ball screw or a linear guideway.

Preferably, the embedding device includes an embedding end surface and a plurality first electrical contacts located on the embedding end surface, and the sensing module has a bonding end surface contacting the embedding end surface, and a plurality of second electrical contacts located on the bonding end surface and aligned to the first electrical contacts, respectively.

Preferably, the memory unit contains an activation serial number and the parameter data of the linear actuator, and the parameter data is one of shaft type, outer diameter, and lead, or a combination thereof.

Preferably, the movable module includes a tubular body and an outer convex ring connecting the tubular body, and a positioning groove is axially recessed in the outer convex ring for accommodation of the embedding device.

Preferably, the movable module includes a tubular body and an outer convex ring connecting the tubular body, and a positioning groove is radially recessed in the outer convex ring for accommodation of the embedding device.

Preferably, the sensing module further includes a three-axis acceleration gauge to define an XYZ three-axis space coordinate and collect acceleration changes and angle changes generated in a gravity direction, and output signals to the calculation control device to calculate an axial direction of the linear actuator.

An identification method for identifying a linear actuator comprising:
 a step of setting including disposing an embedding device on a movable module, and connecting a sensing module of a sensing device to the embedding device;
 a step of activating including: outputting, by a memory unit of the embedding device, a parameter data to a second transmission unit of the sensing module through a first transmission unit, transmitting, by the second transmission unit of the sensing module, the parameter data to a third transmission unit of a microprocessor, capturing, by a first calculation unit of the microprocessor, the parameter data received by the third transmission unit, and determining whether the parameter data is correct, when the parameter data is correct, the sensing device is activated, and when the parameter data is incorrect, the sensing device is not activated; and
 a step of analyzing including: receiving, by a fourth transmission unit of a calculation control device, the parameter data, then, reading, by a second calculation unit of the calculation control device, the parameter data, and analyzing and determining whether the sensing device is in normal operation.

Preferably, in the step of activating, the second calculation unit of the calculation control device determines whether an axis-type parameter of the ball screw is repeated.

Preferably, in the step of activating, the second calculation unit of the calculation control device determines whether the ball screw has different axis angle parameters.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 16:
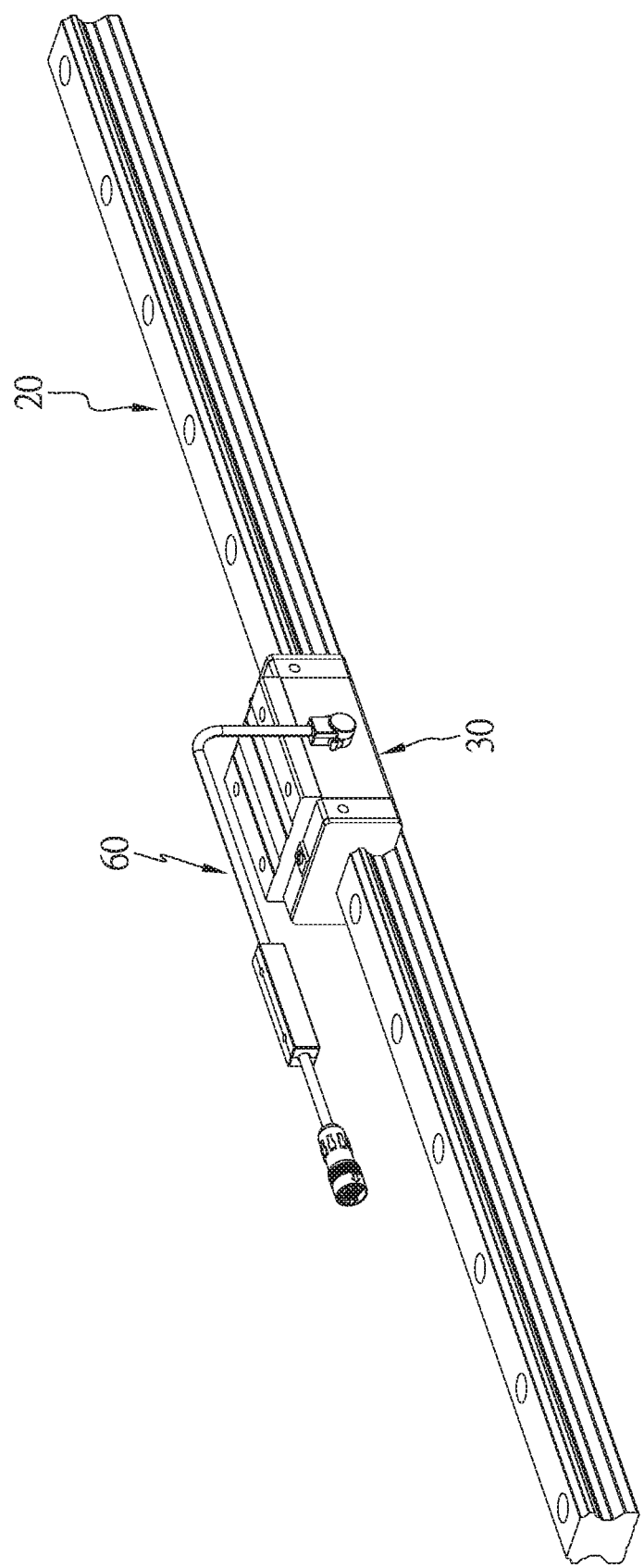
FIG. 16 is a perspective assembled view of a fifth embodiment of the present invention showing the application in a linear guideway.
Figure 17:
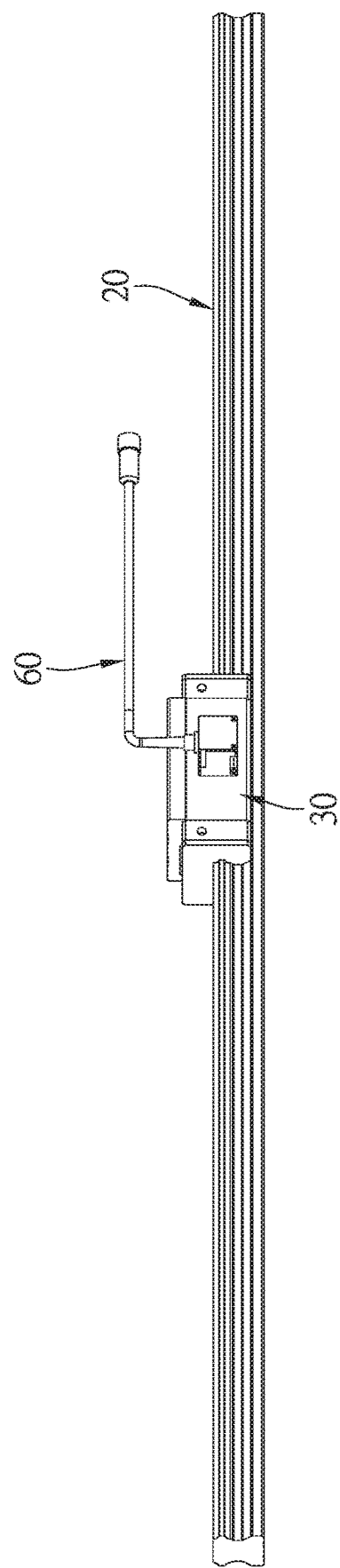
FIG. 17 is a perspective assembled view of a sixth embodiment of the present invention showing the application in a linear guideway.

Referring to FIGS. 2-9, a linear actuator of a first embodiment of the present invention is shown, the linear actuator is a ball screw for example, but is not limited thereto, or can be a linear guideway as shown in FIGS. 16 and 17. The linear actuator essentially comprises: an elongated shaft 20, a movable module 30, a rolling unit 40, an embedding device 50, a sensing device 60, and a calculation control device 70.

The elongated shaft 20 extends along an axial direction X. In this embodiment, the elongated shaft 20 is a screw and has a screw annular surface 21 and an outer rolling groove 22 helically formed in the screw annular surface 21.

Figure 14:
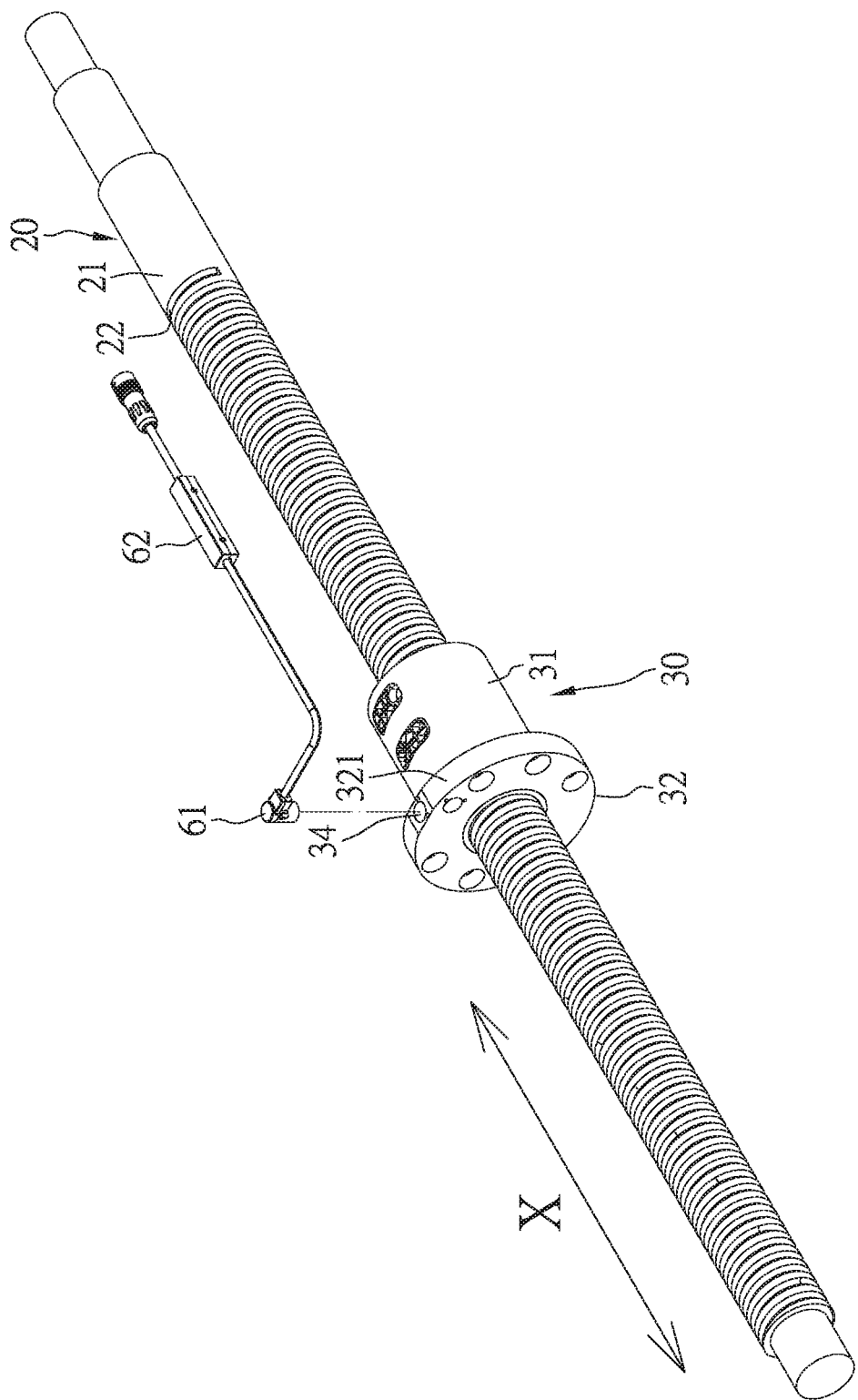
FIG. 14 is an exploded perspective view of a third embodiment of the present invention, showing the outer annular surface of the outer convex ring having a radially positioning groove.

The movable module 30 is a nut linearly movably disposed on the elongated shaft 20 along the axial direction X, and includes: a tubular body 31, an outer convex ring 32 (which is generally referred to as a flange in the industry) connecting the tubular body 31, an inner rolling groove 33 disposed on an inner surface of the tubular body 31 and aligned to the outer rolling groove 22 of the elongated shaft 20, and a positioning groove 34 recessed in the outer convex ring 32. A load path T is formed between the inner rolling groove 33 of the movable module 30 and the outer rolling groove 22 of the elongated shaft 20. In this embodiment, the positioning groove 34 is axially recessed at one end of the outer convex ring 32 of the movable module 30, but is not limited thereto, please refer to FIG. 14, the positioning groove 34 can also be radially recessed in the outer annular surface 321 of the outer convex ring 32, which can also achieve the same effect as above.

The rolling unit 40 is rollably disposed in the load path T, and takes the form of balls for example, but is not limited thereto.

The embedding device 50 is disposed in the positioning groove 34 of the movable module 30, abuts against a bottom surface of the positioning groove 34, and includes: a memory unit 51 for storing parameter data of the linear actuator, a first transmission unit 52 connected to the memory unit 51, an embedding end surface 53, and a first power supply unit 54 connected to and supplying power to the first transmission unit 52. In this embodiment, the embedding end surface 53 of the embedding device 50 has four first electrical contacts 531 which are Rx/data, VCC, GND, and Tx/Clock, respectively. The memory unit 51 contains an activation serial number and the parameter data of the linear actuator. The parameter data is one of shaft type, outer diameter, and lead, or a combination thereof, and the activation serial number and the parameter data can be set together or separately.

Figure 15:
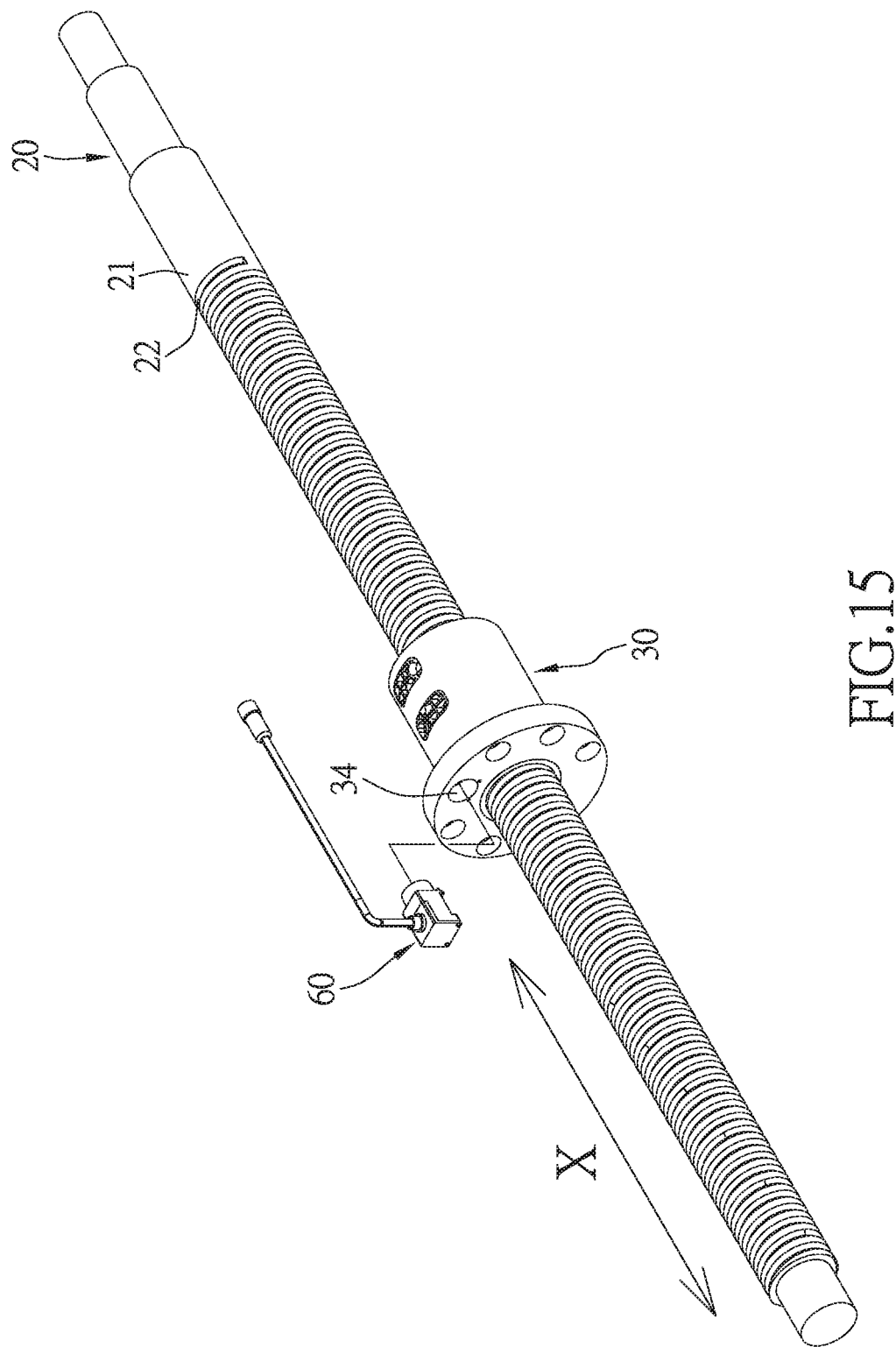
FIG. 15 is an exploded perspective view showing a fourth embodiment of the present invention, showing that the sensing device is an integral unit.

The sensing device 60 is disposed on the movable module 30 and coupled to the embedding device 50. The sensing device 60 is signally connected to the embedding device 50 and has a sensing module 61 and a microprocessor 62 signally connected to the sensing module 61. The sensing module 61 has a second transmission unit 611 signally connected to the first transmission unit 52, a second power supply unit 612 connected to the second transmission unit 611, a bonding end surface 613 contacting the embedding end surface 53, and four second electrical contacts 614 located on the bonding end surface 613 and aligned to the four first electrical contacts 531, respectively. The four second electrical contacts 614 are Tx/data, VCC, GND and Rx/Clock respectively. The microprocessor 62 has a third transmission unit 621 signally connected to the second transmission unit 611, a first calculation unit 622 connected to the third transmission unit 621, and a third power supply unit 623 connected to the first calculation unit 622. The four second electrical contacts 614 of the bonding end surface 613 of the sensing module 61 respectively contact the four first electrical contacts 531 of the embedding end surface 53 to read the parameter data outputted from the first transmission unit 52 of the embedding device 50. The second transmission unit 63 of the sensing device 60 then outputs the parameter data to the third transmission unit 621 of the microprocessor 62, and the first calculation unit 622 of the microprocessor 62 captures the parameter data received by the third transmission unit 621 and determines whether one or more of the parameter data are correct, thereby determining whether the sensing device 60 is activated. In this embodiment, the sensing module 61 and the microprocessor 62 of the sensing device 60 are separated from each other, but are not limited thereto. Referring to FIG. 15, the sensing device 60 can also be an integral unit, which can also achieve the same effects as described above. In addition, the sensing device 60 is one of a vibration sensor, a temperature sensor, a magnetic field sensor, an acoustic wave sensor, a humidity sensor, an acid-base sensor, a light sensor, a metal sensor, a gas sensing device and a microparticle sensor, or a combination of the aforementioned sensors.

The calculation control device 70 is signally connected to the sensing device 60, and has a fourth transmission unit 71 connected to the third transmission unit 621 of the sensing module 61, a second calculation unit 72 connected to the fourth transmission unit 71, and a fourth power supply unit 73 connected to the second calculation unit 72. When the sensing device 60 is activated, the second calculation unit 72 is used to calculate the state of the linear actuator. In this embodiment, the sensing device 60 outputs the signal for sensing the ball screw to the calculation control device 70 in a wired manner, but not limited thereto, or in a wirelessly manner. The calculation control device 70 can be a smart electronic device such as a desktop computer or an Ipad. It is worth mentioning that the calculation control device 70 can be connected to a warning device (not shown) which provides a simple button calculation and an abnormal state warning light.

It should be noted that, as shown in FIGS. 10-13, in some embodiments, the sensing module 61 further includes a three-axis acceleration gauge 615 connected to the second transmission unit 611. The three-axis acceleration gauge 615 defines an XYZ three-axis space coordinate and collects acceleration changes and angle changes generated in the gravity direction, and the second transmission unit 611 outputs signals to the microprocessor 62. The microprocessor 62 then sends the signals to the calculation control device 70 to calculate the axial direction of the linear actuator. Take FIG. 11 as an example, let's define that: the Y-axis direction refers to the direction in which the front and rear ends of the elongated shaft 20 extend, the Z-axis direction refers to the direction in which the left and right sides of the elongated shaft 20 extend; the X-axis direction refers to the direction in which the upper and lower ends of the elongated shaft 20 extend. If the Z-axis direction and the Y-axis direction are parallel to the ground and the X-axis direction is perpendicular to the ground, that is, the Z-axis direction and the Y-axis direction are not subjected to any external force, therefore, the Z-axis direction and the Y-axis direction output an acceleration of 0 g (gravity), and the X-axis direction is subjected to acceleration (gravity) of 1 g in the negative direction. If the Z-axis direction is perpendicular to the ground, and the X-axis direction and the Y-axis direction are parallel to the ground, that is, the X-axis direction and the Y-axis direction are not subjected to any external force, so the X-axis direction and the Y-axis direction output an acceleration of 0 g (gravity), while the Z-axis direction is subjected to an acceleration (gravity) of 1 g in the negative direction.

For another example, if the X-axis direction changes from the negative direction 1$g$ to the positive direction 1$g$, at this time, after angle conversion, the angle of the X-axis direction with respect to the gravity direction will be changed from 180 degrees to 0 degrees. Since the Z-axis direction must be 90 degrees perpendicular to the X-axis direction, it can be judged whether the X-axis direction is located at the left quadrant of the coordinate or the right quadrant of the coordinate by the positive and negative directions of the acceleration in the Z-axis direction, thereby the three-axis acceleration gauge 615 is capable of determining the type of the screw shaft.

The above description is the structure and configuration description of the main components of the embodiment of the present invention.

As for the identification method for identifying the linear actuator of the present invention, please refer to the following description.

Referring to FIGS. 2-9, the identification method for identifying the linear actuator according to the embodiment of the present invention mainly includes a step 81 of setting, a step 82 of activating, a step 83 of analyzing, a step 84 of transmitting, and a step 85 of calculating.

The step 81 of setting includes: disposing the embedding device 50 on the movable module 30, and making the bonding end surface 613 of the movable module 30 contact the embedding end surface 53 of the embedding device 50.

The step 82 of activating includes: outputting, by the memory unit 51 of the embedding device 50, the parameter data to the second transmission unit 611 of the sensing module 61 through the first transmission unit 52, transmitting, by the second transmission unit 611 of the sensing module 61, the parameter data to the third transmission unit 621 of the microprocessor 62, then capturing, by the first calculation unit 622 of the microprocessor 62, the parameter data received by the third transmission unit 621, and determining whether the parameter data is correct, when the parameter data is correct, the sensing device 60 is activated, and when the parameter data is incorrect, the sensing device 60 is not activated.

Figure 1:
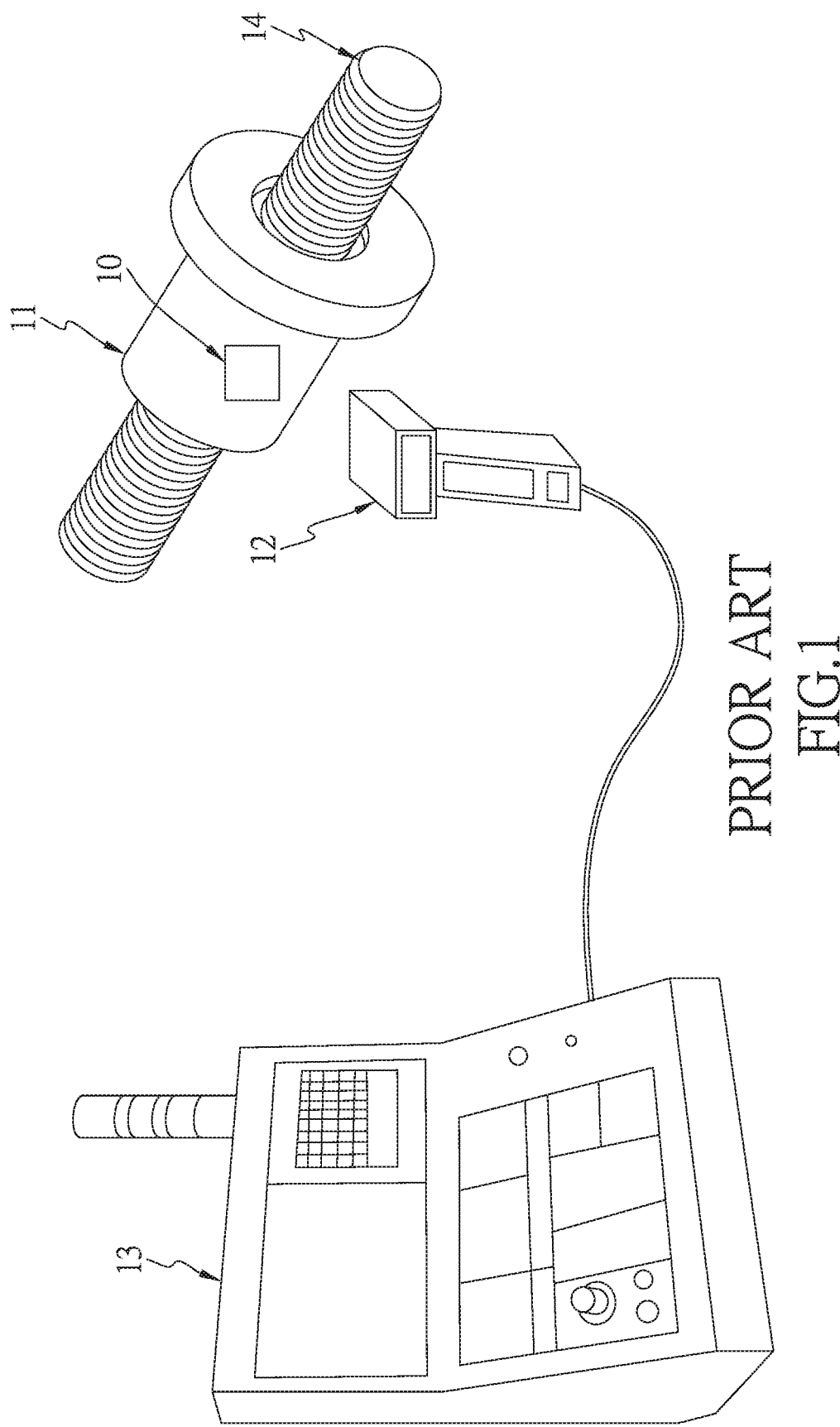
FIG. 1 is one of the drawings of the Taiwan Patent No. (1600492) showing a method for compensating the lead error of a ball screw.
Figure 2:
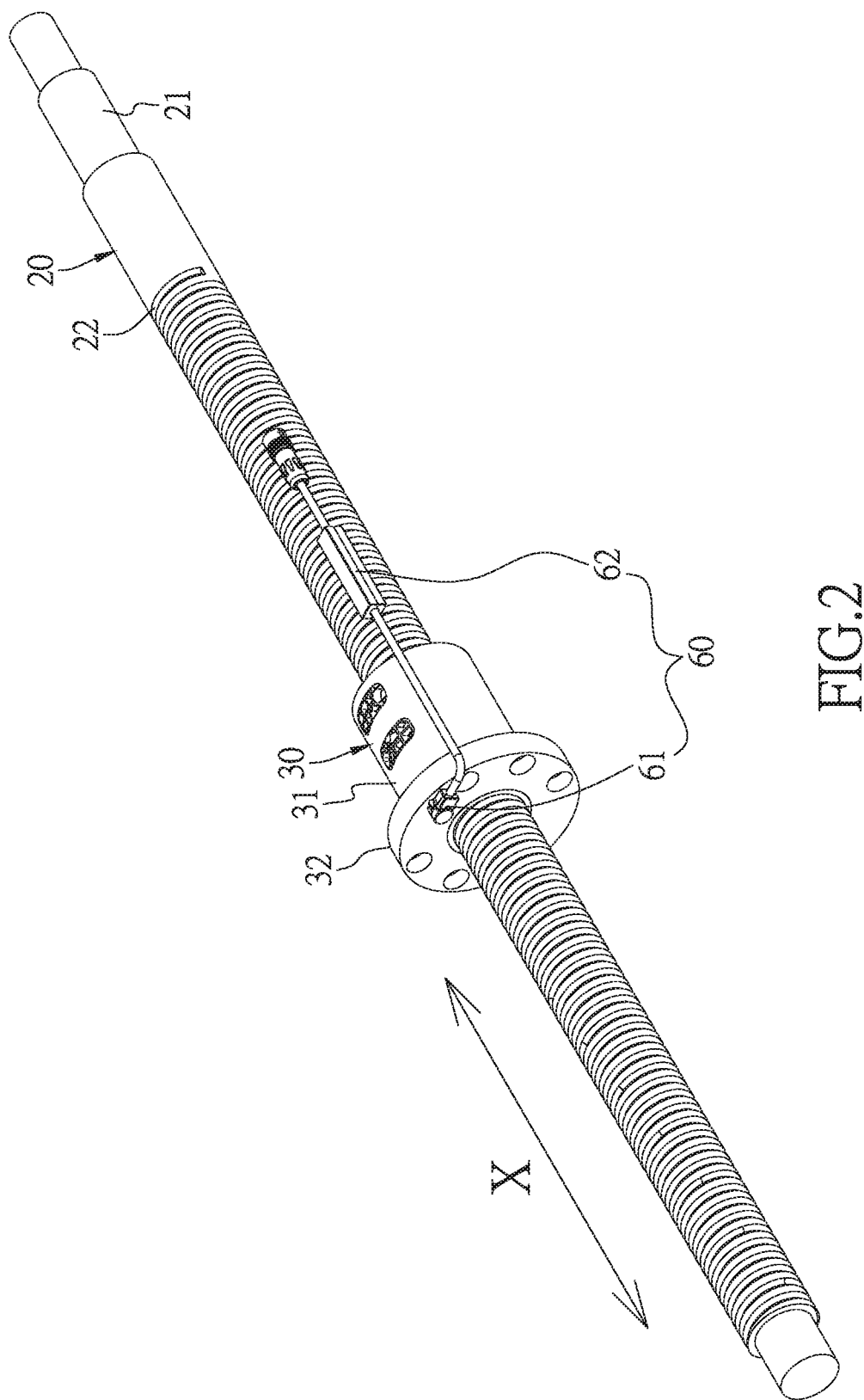
FIG. 2 is a perspective assembled view of a first embodiment of the present invention.
Figure 3:
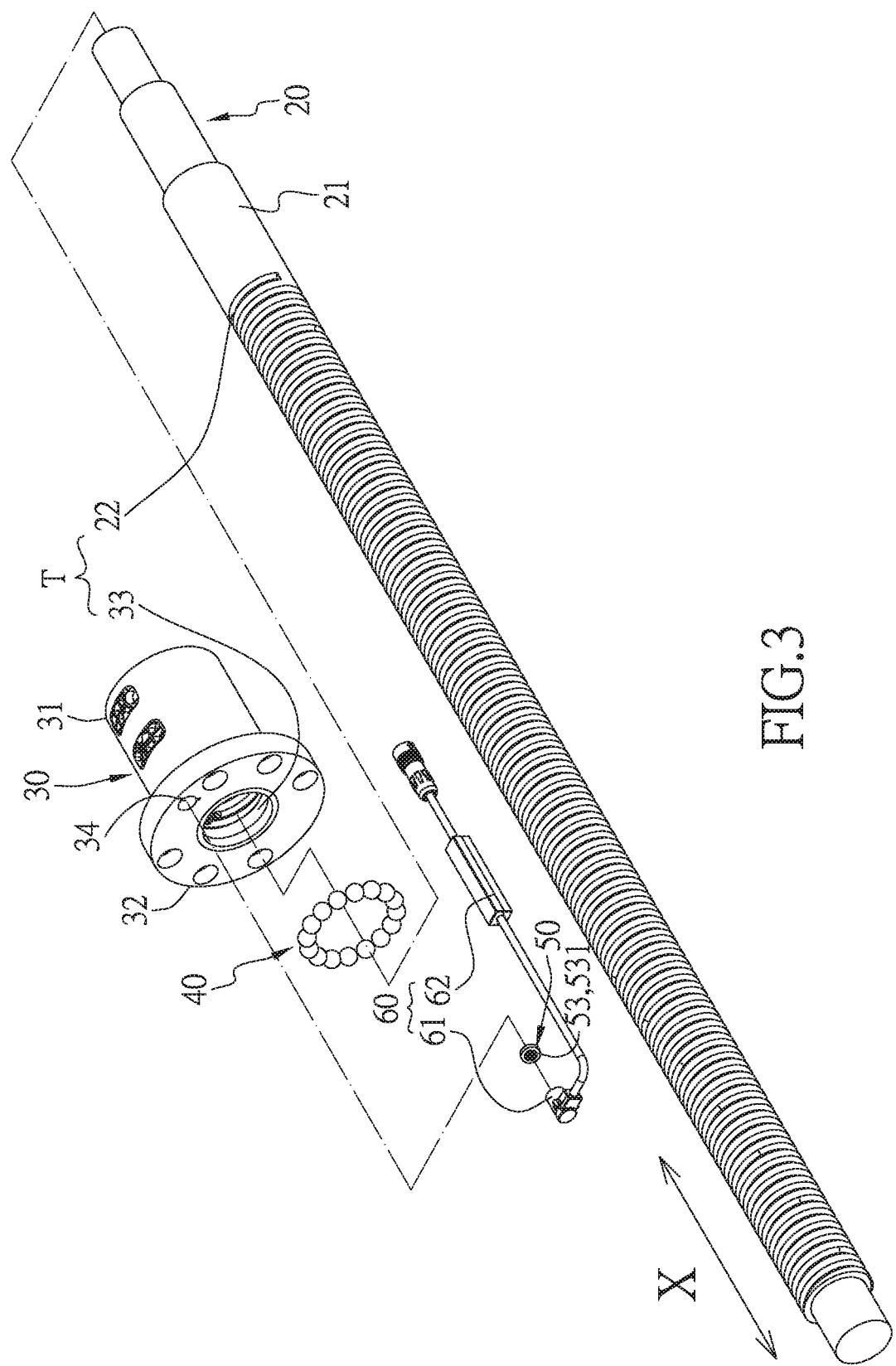
FIG. 3 is an exploded perspective view of the first embodiment of the present invention.
Figure 4:
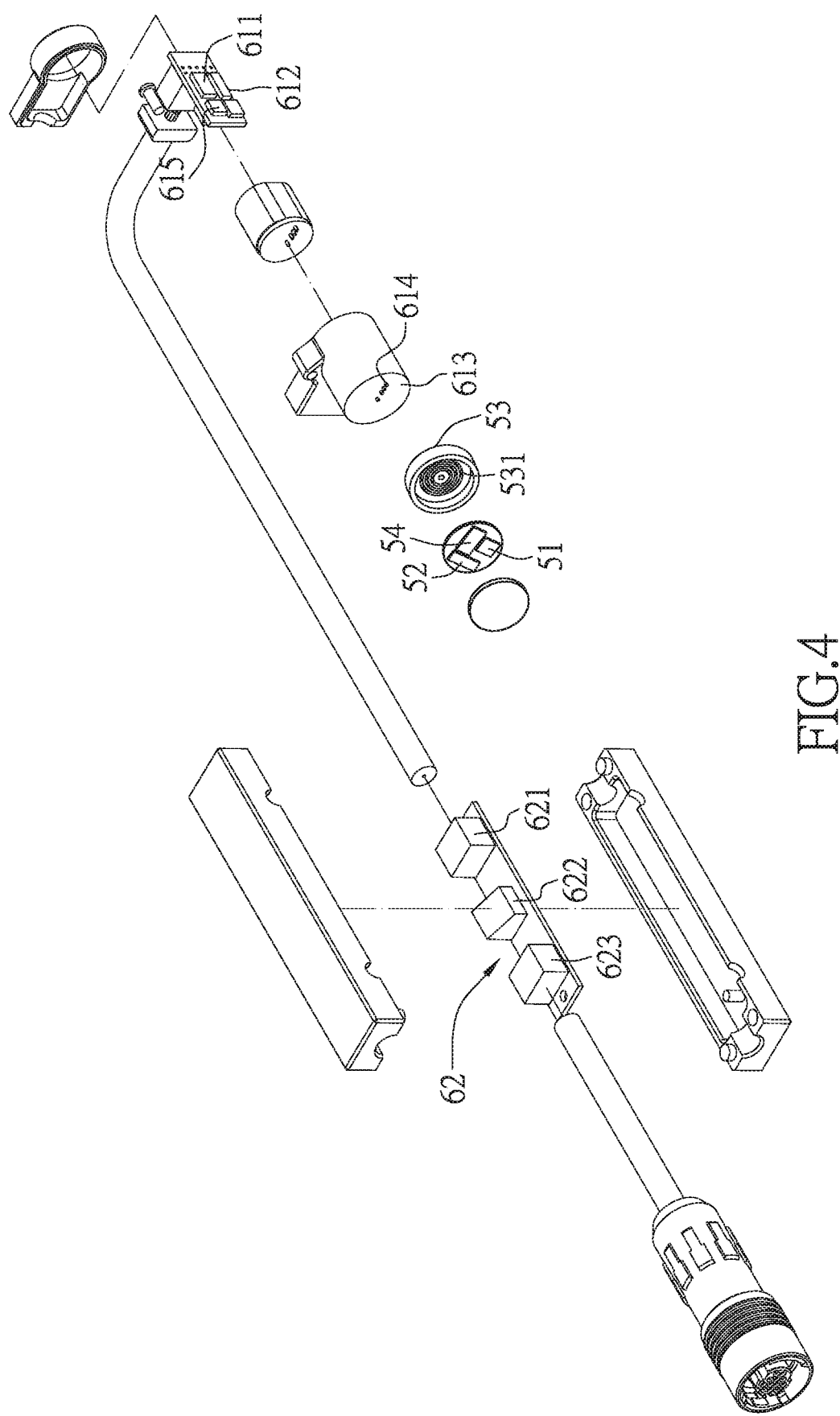
FIG. 4 is an exploded view of the embedding device and sensing device of the first embodiment of the present invention.
Figure 5:
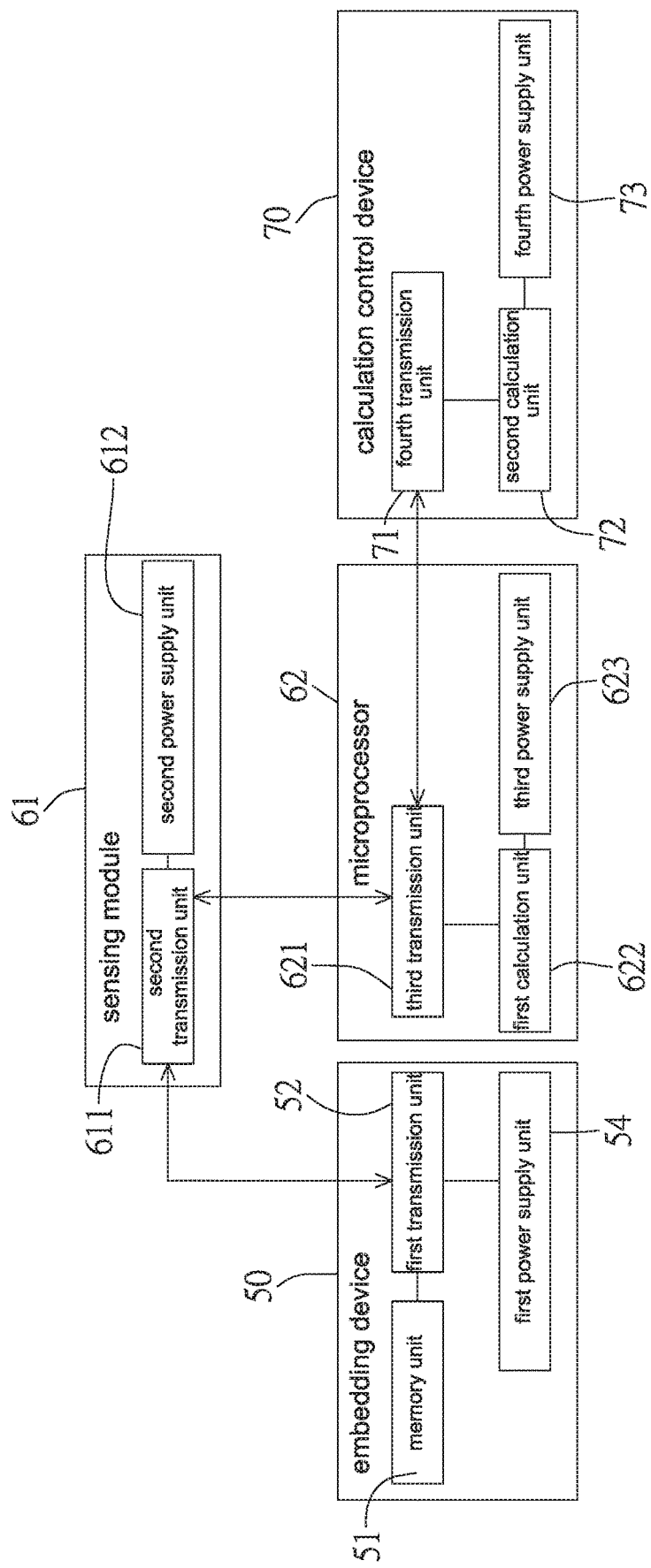
FIG. 5 is a block diagram of a first embodiment of the present invention.
Figure 6:
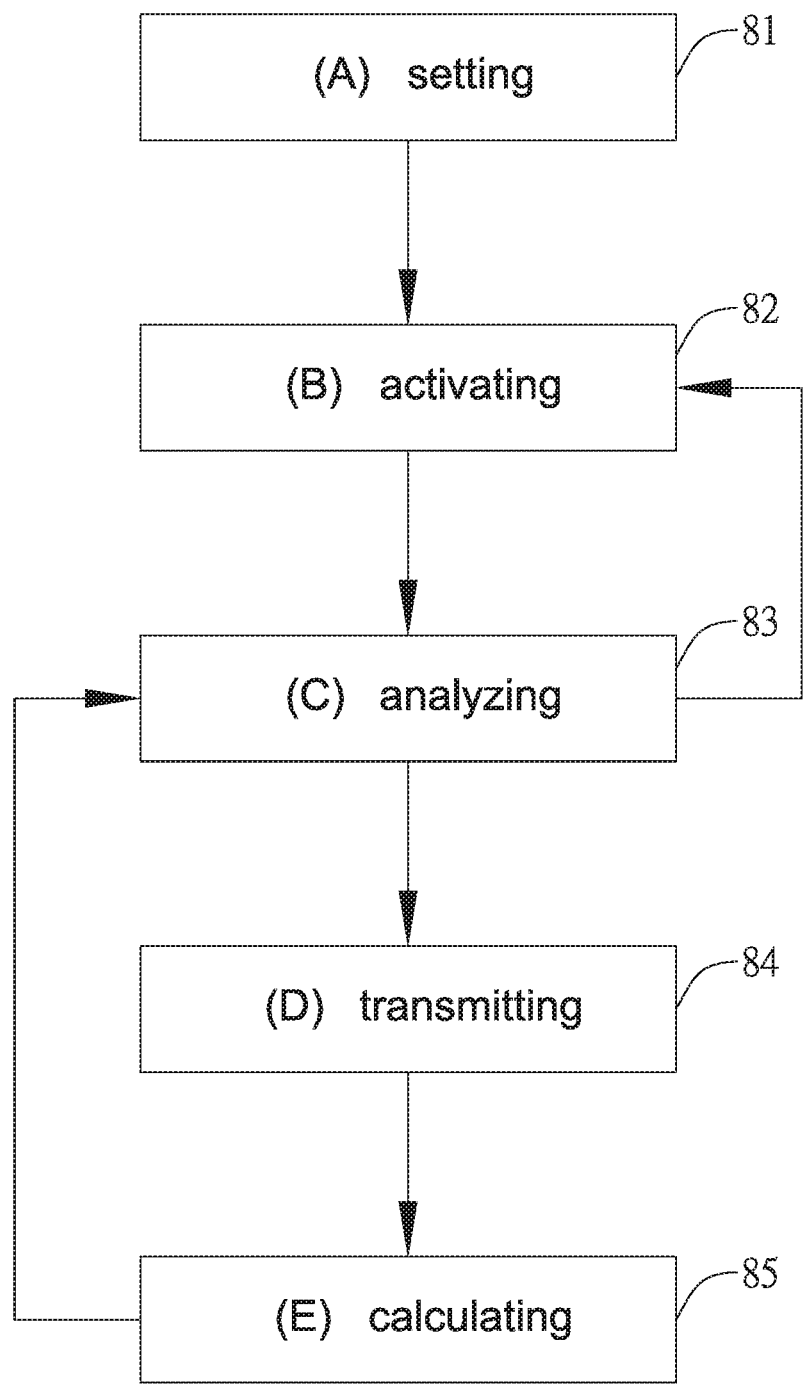
FIG. 6 is a flow chart of the first embodiment of the present invention.
Figure 7:
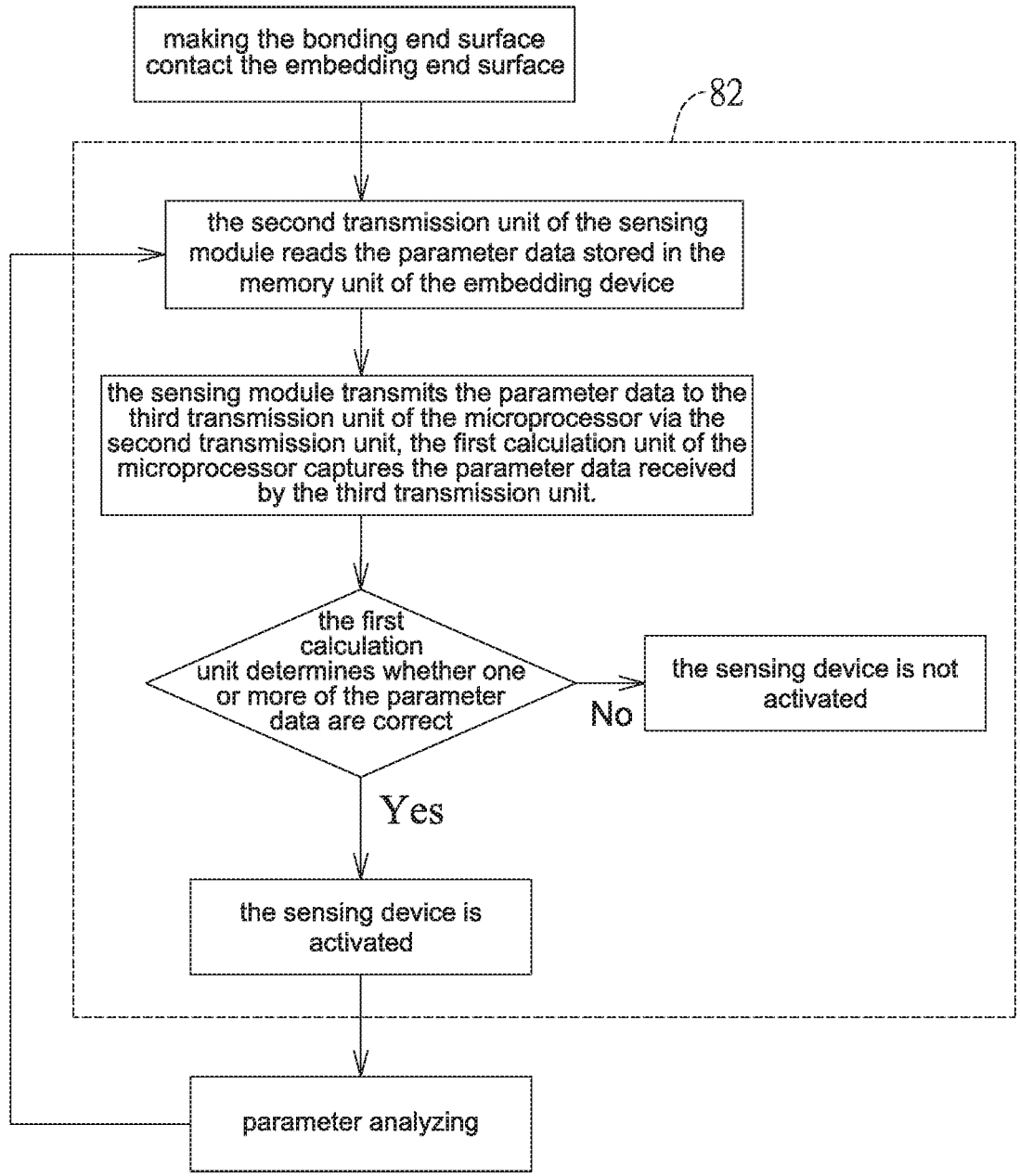
FIG. 7 is a flow chart showing the activation of the first embodiment of the present invention.
Figure 8:
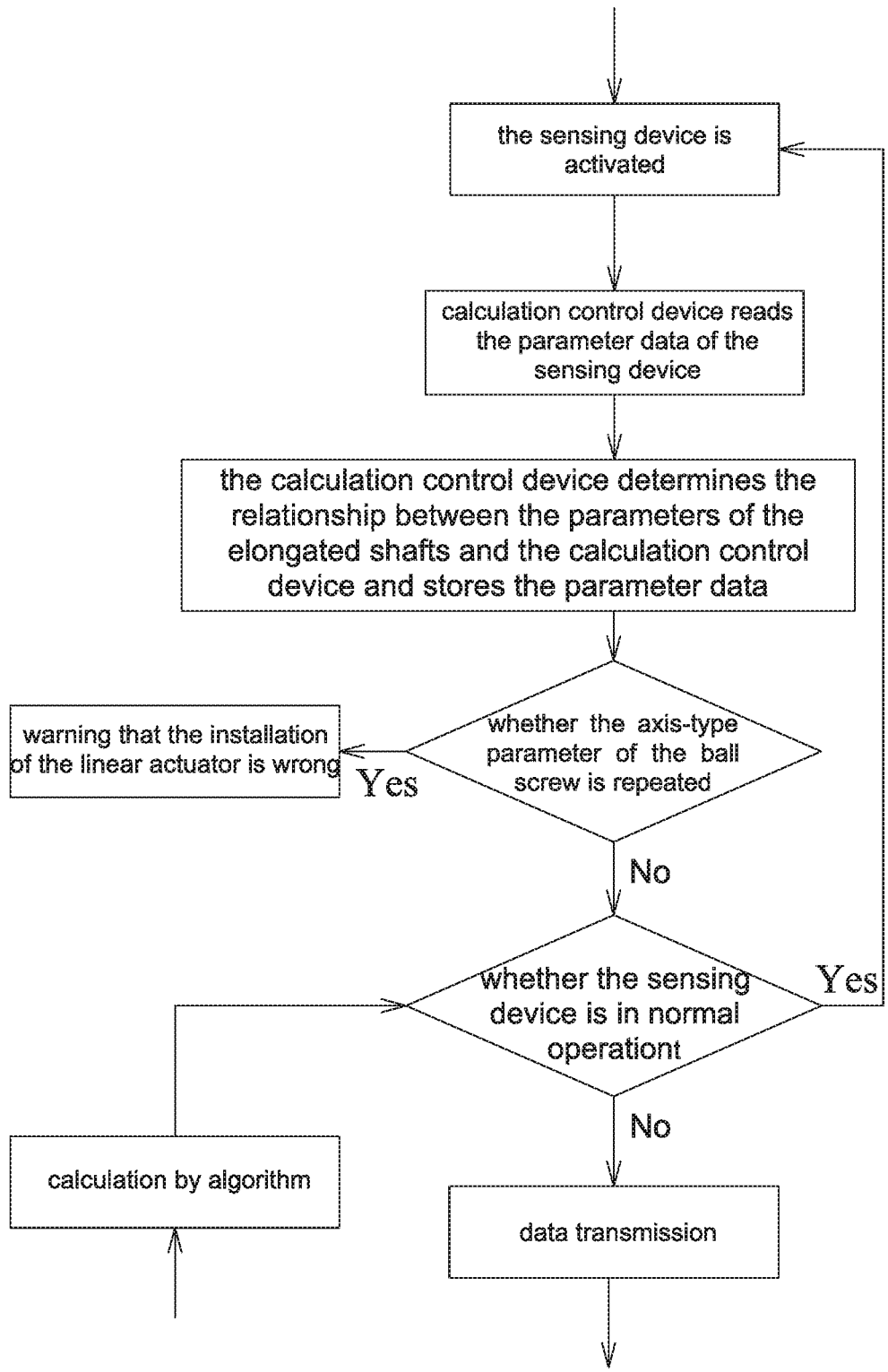
FIG. 8 is a flow chart (1) of analyzing in accordance with the first embodiment of the present invention.
Figure 9:
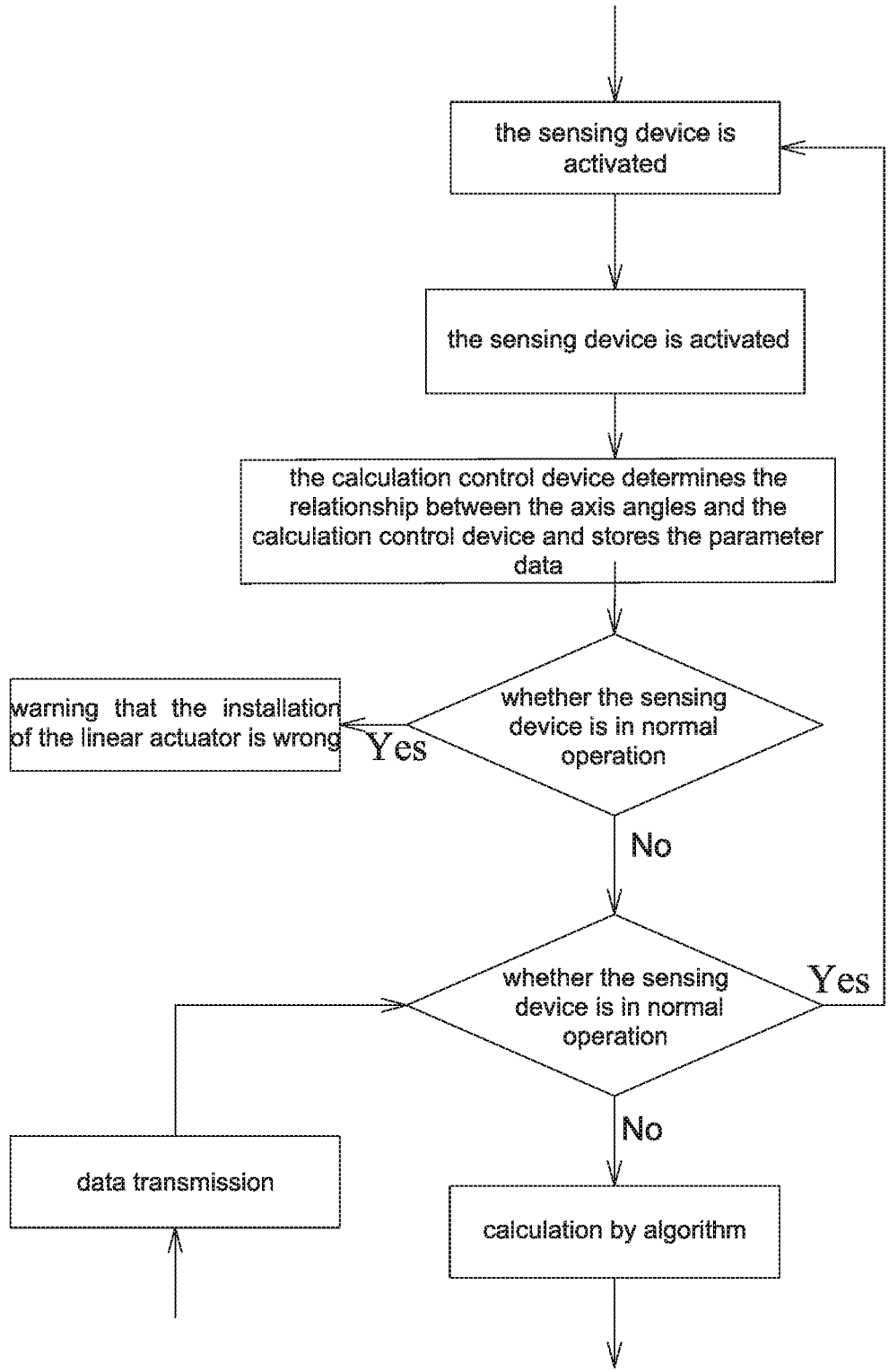
FIG. 9 is a flow chart (2) of the analyzing in accordance with the first embodiment of the present invention.
Figure 10:
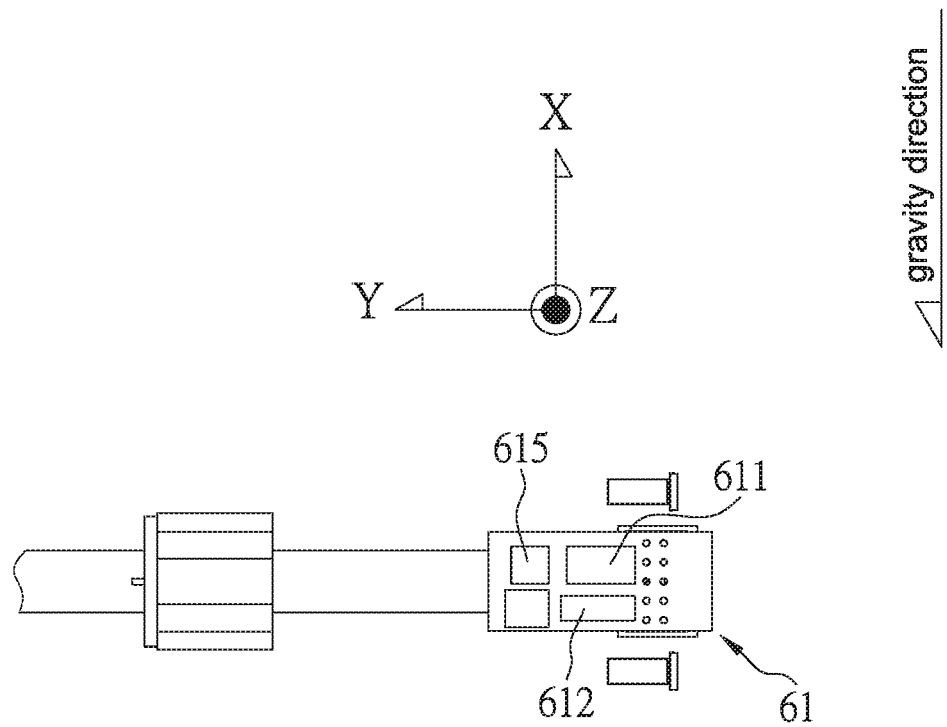
FIG. 10 is a schematic illustration of a second embodiment of the present invention showing the three-axis acceleration gauge and gravity direction when the linear actuator is in the X-axis.
Figure 11:
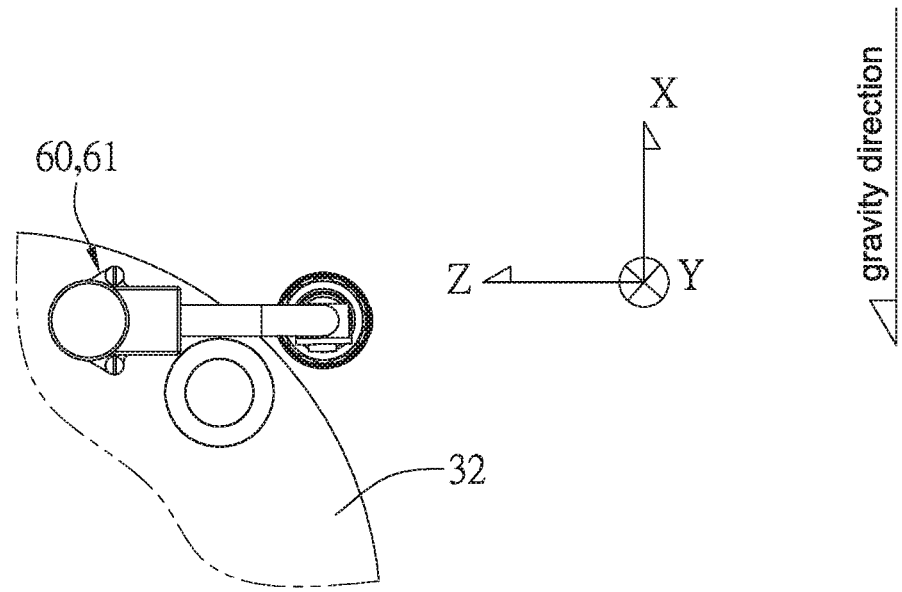
FIG. 11 is a schematic view of the second embodiment of the present invention showing the three-axis acceleration gauge and the direction of gravity when the linear actuator is in the Y-axis.
Figure 12:
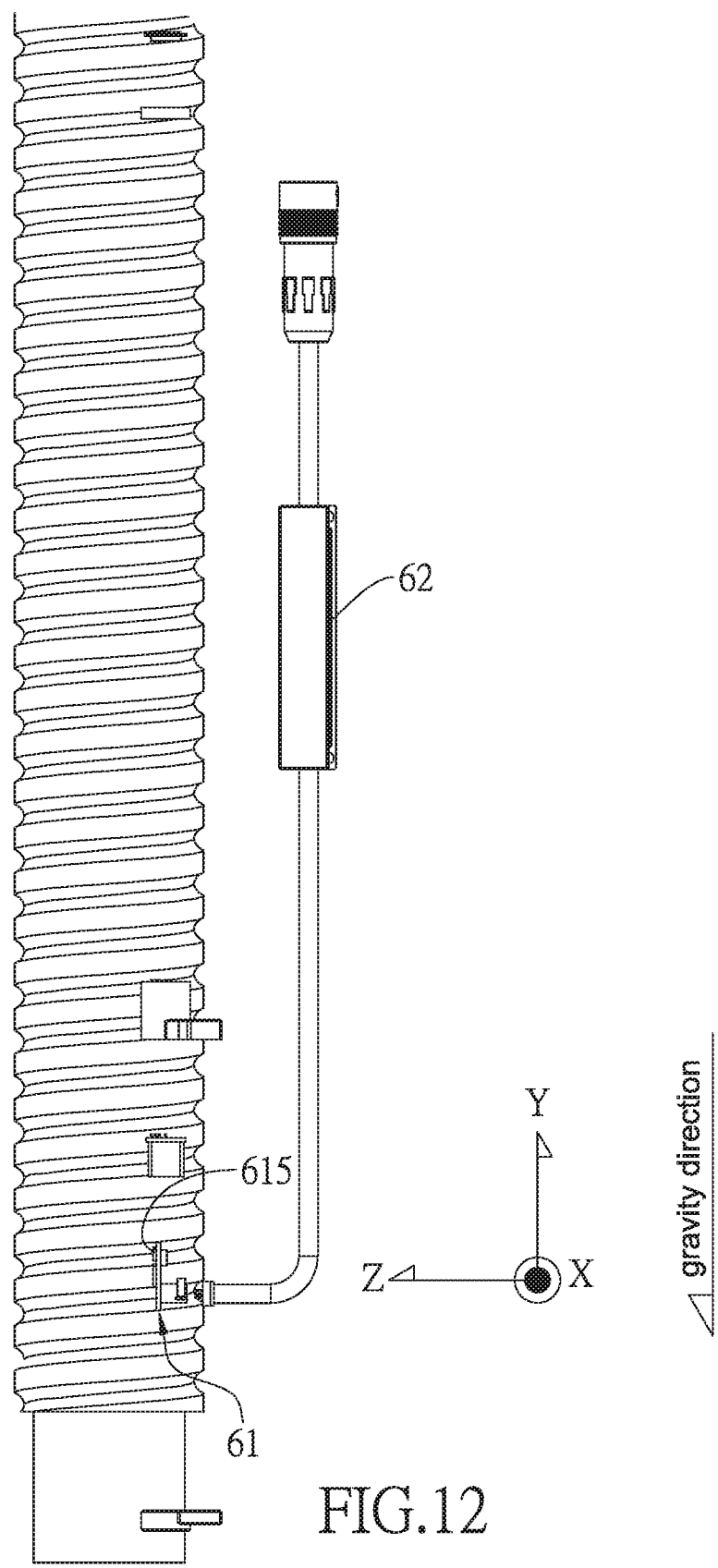
FIG. 12 is a schematic view of the second embodiment of the present invention showing the three-axis acceleration gauge and the direction of gravity when the linear actuator is in the Z-axis.
Figure 13:
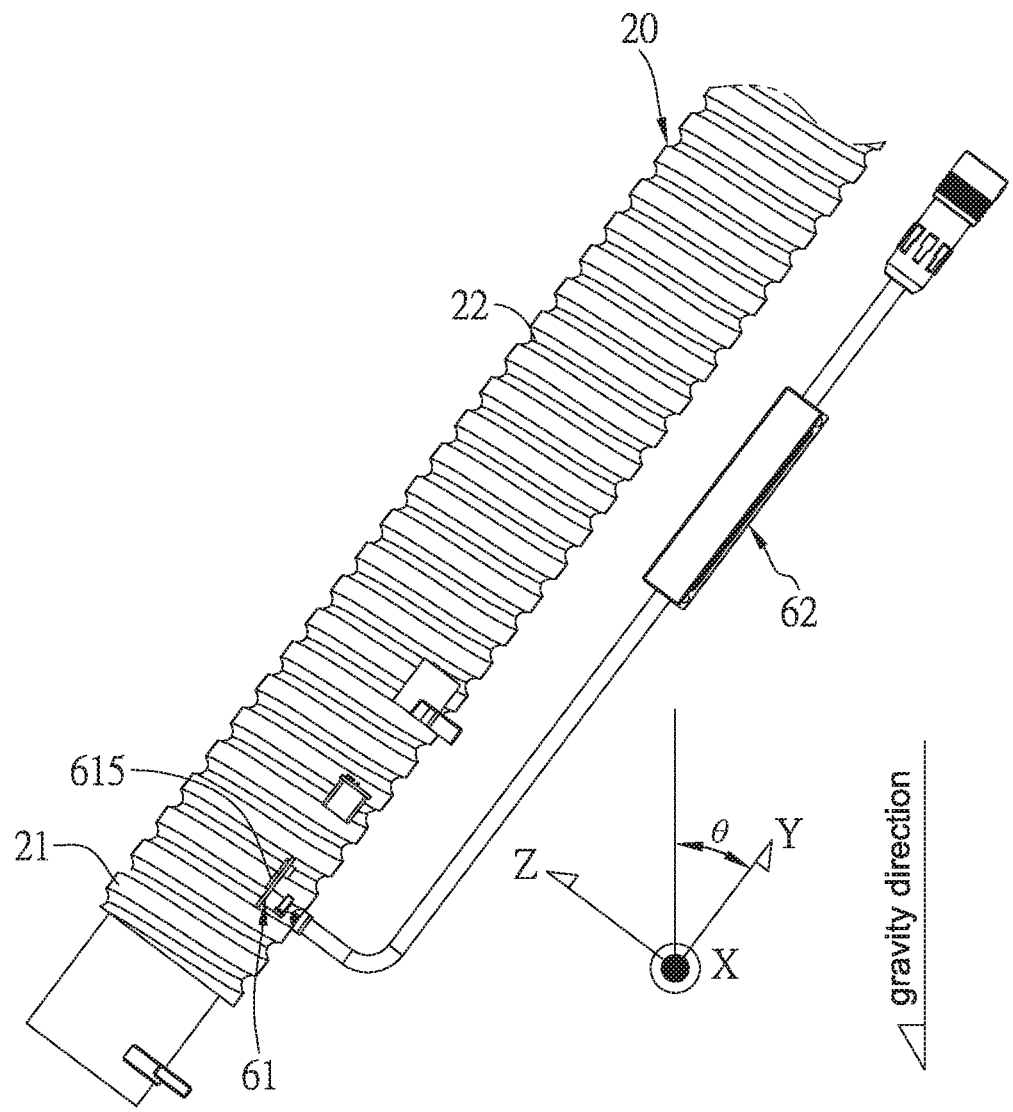
FIG. 13 is a schematic illustration of the second embodiment of the present invention showing the inclined mounting of the linear actuator and the axis of the accelerating gauge.

The step 83 of analyzing includes: receiving, by the fourth transmission unit 71 of the calculation control device 70, the parameter data, then, reading, by the second calculation unit 72 of the calculation control device 70, the parameter data, and analyzing and determining whether the sensing device 60 is in normal operation. Referring to FIG. 8, in a preferred embodiment, the second calculation unit 72 of the calculation control device 70 determines whether the axis-type parameter of the ball screw is repeated and stores the axis-type parameter. It should be noted that in the actual application, there may be a plurality of movable modules 30 respectively mounted on a plurality of elongated shafts 20 located in different axial directions, so there may be a case where the movable module 30 is mounted on the wrong elongated shaft 20. Therefore, when the axis-type parameter is repeated, the warning device of the calculation control device 70 warns that the linear actuator is installed incorrectly. When the axis parameter is not repeated, proceed to the next step. Referring to FIG. 9, in another preferred embodiment, the second calculation unit 72 of the calculation control device 70 determines whether the ball screw has different axis angle parameters and stores the axis angle parameters. When the axis angle parameter is repeated, the warning device of the calculation control device 70 warns that the linear actuator is incorrectly installed. When the axis angle parameter is not repeated, skip to the next step.

The step 84 of transmitting includes: producing, by the first calculation unit 622 of the microprocessor 62, a data outputted by the third transmission unit 621.

The step 85 of calculating includes: receiving, by the fourth transmission unit 71 of the calculation control device 70, the data outputted from the third transmission unit 621, and transmitting the data to the second calculation unit 72, and then calculating, by the second calculation unit 72, the state of the linear actuator.

Accordingly, the present invention provides a linear actuator and an identification method thereof, mainly comprising the elongated shaft 20, the movable module 30, the rolling unit 40, the embedding device 50, the sensing device 60, and the calculation control device 70. The present invention is characterized in that the memory unit 51 of the embedding device 50 stores the parameter data of the linear actuator, such as the parameters and the axial position of the elongated shaft, and the microprocessor 62 determines whether the sensing device 60 is activated, and through the process of parameter analysis, data transmission, and algorithm calculation, the calculation control device 70 performs an instantaneous calculation to determine the state of the linear actuator, thereby improving the disadvantage of a single function of the conventional technology, avoiding the problem that the unidentified linear actuator causes the abnormality of the sensing device, effectively finding the problem of abnormal function of the linear actuator, and eliminating the need to manually input parameters to avoid the parameter input error.

In addition, in the conventional structure, when the linear actuator is sensing, both ends of the connecting wire connecting the sensing device and the linear actuator should be marked to distinguish on what type of linear actuator the sensing device is mounted, which greatly increases the installation time and the probability of error. However, through the design of the present invention, it is easy for the equipment manufacturer to do wiring (ie, the wiring is foolproof design, thereby avoiding the problem of wiring errors).

It should be noted that the above embodiment is described by taking a ball screw as an example, and as shown in FIGS. 16 and 17, the linear actuator of the embodiment can also be applied to a linear guideway, namely, the elongated shaft 20 is a slide rail, the movable module 30 is a slide block, and the sensing device 60 is disposed on one side of the movable module 30. The sensing device 60 in FIG. 16 is disassembled into a separated type sensing device, and the sensing device 60 in FIG. 17 is an integral unit, which can also achieve the same effects as described above.

While we have shown and described various embodiments in accordance with the present invention, it is clear to those skilled in the art that further embodiments may be made without departing from the scope of the present invention.

What is claimed is:

1. A linear actuator comprising:
an elongated shaft having an outer rolling groove;
a movable module movably disposed on the elongated shaft and having an inner rolling groove aligned to the outer rolling groove of the elongated shaft, wherein the inner rolling groove and the outer rolling groove define a load path;
a rolling unit rollably disposed in the load path;
an embedding device disposed in the movable module, and having a memory unit for storing parameter data of the linear actuator and a first transmission unit connected to the memory unit;
a sensing device signally connected to the embedding device and having a sensing module and a microprocessor signally connected to the sensing module, the sensing module having a second transmission unit signally connected to the first transmission unit, the microprocessor having a third transmission unit signally connected to the second transmission unit and a first calculation unit connected to the third transmission unit, wherein the first calculation unit determines whether the sensing device is activated according to the parameter data stored in the memory unit; and
a calculation control device signally connected to the sensing device, and having a fourth transmission unit connected to the third transmission unit and a second calculation unit connected to the fourth transmission unit, when the sensing device is activated, the second calculation unit is used to calculate a state of the linear actuator.

2. The linear actuator as claimed in claim 1, wherein the linear actuator is a ball screw or a linear guideway.

3. The linear actuator as claimed in claim 1, wherein the embedding device includes an embedding end surface and a plurality first electrical contacts located on the embedding end surface, and the sensing module has a bonding end surface contacting the embedding end surface, and a plurality of second electrical contacts located on the bonding end surface and aligned to the first electrical contacts, respectively.

4. The linear actuator as claimed in claim 1, wherein the memory unit contains an activation serial number and the parameter data of the linear actuator, and the parameter data is one of shaft type, outer diameter, and lead, or a combination thereof.

5. The linear actuator as claimed in claim 1, wherein the movable module is a ball screw including a tubular body and an outer convex ring connecting the tubular body, and a positioning groove is axially recessed in the outer convex ring for accommodation of the embedding device.

6. The linear actuator as claimed in claim 1, wherein the movable module is a ball screw including a tubular body and an outer convex ring connecting the tubular body, and a positioning groove is radially recessed in the outer convex ring for accommodation of the embedding device.

7. The linear actuator as claimed in claim 1, wherein the sensing module further includes a three-axis acceleration gauge to define an XYZ three-axis space coordinate and collect acceleration changes and angle changes generated in a gravity direction, and output signals to the calculation control device to calculate an axial direction of the linear actuator.

8. An identification method for identifying a linear actuator comprising:
- a step of setting including disposing an embedding device on a movable module, and connecting a sensing module of a sensing device to the embedding device;
- a step of activating including: outputting, by a memory unit of the embedding device, a parameter data to a second transmission unit of the sensing module through a first transmission unit, transmitting, by the second transmission unit of the sensing module, the parameter data to a third transmission unit of a microprocessor, capturing, by a first calculation unit of the microprocessor, the parameter data received by the third transmission unit, and determining whether the parameter data is correct, when the parameter data is correct, the sensing device is activated, and when the parameter data is incorrect, the sensing device is not activated; and
- a step of analyzing including: receiving, by a fourth transmission unit of a calculation control device, the parameter data, then, reading, by a second calculation unit of the calculation control device, the parameter data, and analyzing and determining whether the sensing device is in normal operation.

9. The identification method for identifying the linear actuator as claimed in claim 8, wherein in the step of activating, the second calculation unit of the calculation control device determines whether an axis-type parameter of the ball screw is repeated.

10. The identification method for identifying the linear actuator as claimed in claim 8, wherein in the step of activating, the second calculation unit of the calculation control device determines whether the ball screw has different axis angle parameters.

* * * * *